United States Patent [19]

Erlandson et al.

[11] 4,223,196
[45] Sep. 16, 1980

[54] WELDED TUBULAR ARTICLES AND METHOD FOR MAKING THE SAME

[75] Inventors: Paul M. Erlandson, New Canaan, Conn.; Lee R. Ullery, Park Forest; Roger S. Brigham, Crete, both of Ill.

[73] Assignee: Continental Can Company Inc., New York, N.Y.

[21] Appl. No.: 11,666

[22] Filed: Feb. 29, 1960

[51] Int. Cl.² .......................... B23K 31/06; B23K 9/02
[52] U.S. Cl. .................................... 219/61.2; 219/64; 219/67; 219/105
[58] Field of Search ............... 219/61.2, 64, 67, 105

[56] References Cited

U.S. PATENT DOCUMENTS

| | | |
|---|---|---|
| 1,249,532 | 12/1917 | Smith et al. . |
| 1,865,531 | 7/1932 | Lutz . |
| 1,905,478 | 4/1933 | Lutz . |
| 1,905,479 | 4/1933 | Lutz . |
| 2,078,546 | 4/1937 | Sebell . |
| 2,187,740 | 1/1940 | Hothersall . |
| 2,454,948 | 11/1948 | Seltzer . |
| 2,673,275 | 3/1954 | Kreft . |
| 3,069,530 | 12/1962 | Early et al. . |

Primary Examiner—Roy N. Envall, Jr.
Attorney, Agent, or Firm—Charles E. Brown

[57] ABSTRACT

A welded seam between overlapped edges of sheet material wherein the sheet material is heated to a temperature below the melting temperature and is forced together under high pressures to form a forged weld. The thickness of the sheet material in the weld area is reduced from double thickness to a thickness approaching a single thickness, with the weld interface being diagonally disposed. The weld is effected by grain growth across the interface such that the particular line along which the meeting surfaces of the metal are welded together is unobservable upon etching a cross section thereof and with magnification on the order of 100X. The heating is effected by applying to opposing edge portions which are to be overlapped and welded a high frequency current which effectively reduces heating to edge portions only of the metal with the heat effected area being in the vicinity of 0.1 inch.

26 Claims, 16 Drawing Figures

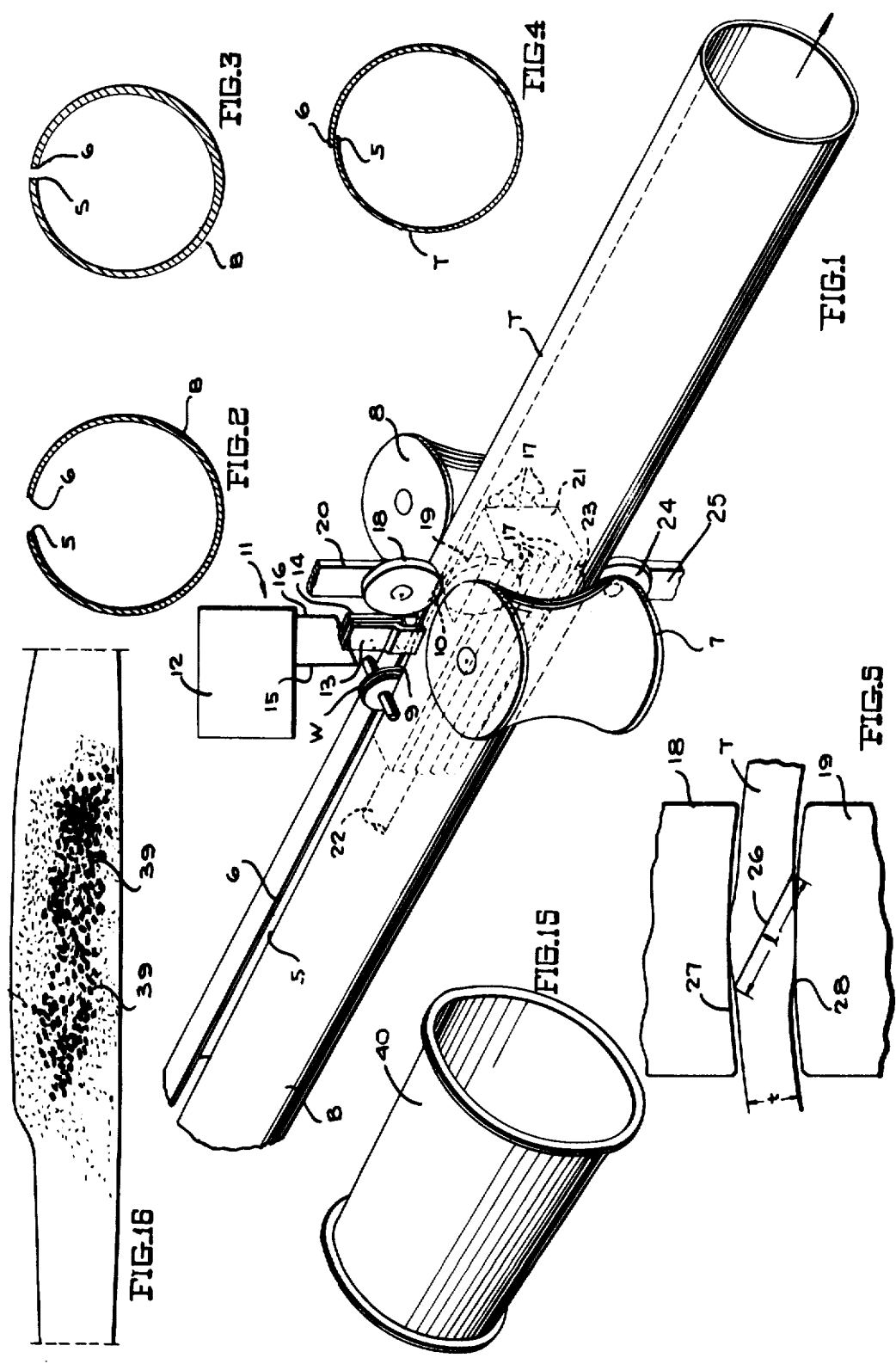

WELDED TUBULAR ARTICLES AND METHOD FOR MAKING THE SAME

This invention relates in general to new and useful improvements in the art of welding, and primarily seeks to provide a commercially feasible weld which may be practiced in the seam welding of thin walled tubing.

Heretofore, seam welding of tubing has been primarily limited to relatively thick walled tubing, and the seam welds have been primarily of the butt weld type. Butt welding has its limitations in that in order to obtain a seam with a maximum strength, it is necessary that the material being welded be disposed in edge-abutting relation throughout the length of the seam and the opposed portions being seam welded should lie in a common plane. In the forming of tubing, it is necessary first to progressively shape a flat strip into the desired generally circular form, and to bring the edges of the strip or tube blank into opposed abutting relation. While this may be accomplished at relatively slow speeds, when attempts have been made to form the seam at high speeds, alignment of the edges of the blank has been improper and the resultant seam weld defective.

There are several factors contributing to the problem of misalignment of the edges of a tube blank. When the tube blank is being formed, at high rate, there is a tendency for the material of the tube blank to wander from a straight line path, with the resultant misalignment of the edges of the tube blank. Also, the strip forming the tube blank, when produced on a mass-production basis, as is necessary in a commercially feasible operation, does not have perfectly straight edges, the edges of the strip having camber. This contributes greatly to the problem of aligning and bringing into abutting engagement the edges of a tubing blank. With a very thin metal, of course, any place the tubing blank edges do not come into direct contact at the time welding is taking place, there is a tendency for a void to exist.

Another disadvantage of a butt weld is that in bringing together the edges of the tubing blank in the formation of the butt weld, the pressure engagement of the edges of the tubing blank during the welding operation results in the outward flow of the plastic metal in the area of the seam, thus resulting in projections on opposite surfaces of the seam weld which must be finished.

A lap weld avoids the problem of alignment. On the other hand, the lap weld results in a double thickness in the area of the weld, which is undesirable for many uses. Further, the lap weld produces two raw edges, one exterior raw edge and one interior raw edge, which are subject to corrosion, especially if a steel coated with tin, zinc, stainless steel, titanium, zirconium, aluminum or the like is used. Of the two types of welds, lap weld and butt weld, for most applications, the lap weld has proven to be the least practical for the manufacture of containers having crimped, seamed top and bottom ends due to having six thicknesses of metal in the crimped seam at the lap-seam junction and only four thicknesses of metal around the rest of the periphery of the crimped seam.

In accordance with the invention, it is proposed to provide a weld which will be hereinafter called a blap weld and which is a combination of the butt weld and a lap weld, the weld incorporating the advantages of both of these other types of welds. It has been found that the problem of alignment, particularly in very thin walled tubing, can be eliminated by overlapping the edges of the tube blank prior to welding, such as is done in the formation of a lap weld. However, in lieu of forming the conventional lap weld, at the time the weld is formed, it is proposed to forge the end portions of the tubing blank in the vicinity of the weld so as to shift the weld juncture from a location parallel to the planes of the overlapped portions to a diagonal position and at the same time work the metal in the area of the weld so that it has a thickness corresponding generally to the thickness of the material of the tube blank.

In the past, attempts have been made to form a combination butt and lap weld of the type to which the present invention generally relates. However, these prior welds have proved to be unsatisfactory in that a weld is formed between the opposed surfaces of the overlapped portions, after which the material of the tube in the area of the seam is worked, as by being passed between rollers. In one form of weld of this general type, the overlapped edges of the tube blank are passed between a pair of roller electrodes and a resistance weld is formed between the opposed surfaces, after which the welded seam is passed between a pair of forging rollers so as to work the seam and thus flatten the seam. In another form of welding to provide a combination butt and lap weld, the roller electrodes also function as the forge rollers so as to forge the metal during and immediately subsequent to the welding of the metal together. In both of these welds, a molten area temporarily exists, with the result that the crystalline structure of the tube in the area of the seam is altered greatly, localized porosity is introduced by shrinkage upon solidification, and a reduction in strength results.

Accordingly, it is another object of the invention to provide a blap weld primarily intended for use in tube seam welding wherein the edges of the tube blank are heated to a sufficiently high temperature to effect forging plasticity in the edges of the tube blank, after which the edges of the tube blank are overlapped and passed between a pair of forge rolls to effect a forge weld. Following this process, bonding is obtained between the overlapped edges of the tube blank substantially without the existence of molten metal during the welding process. At the same time, the forging operation is sufficient to reduce the thickness of the lapped portions of the tube blank to substantially that of the original thickness of the tube blank. An obliteration of the original weld interface results.

Yet another object of the invention is to provide a blap weld which is suitable for a seam weld in the formation of thin walled tubing, the blap weld being effected by heating the extreme edges of a tube blank until forging plasticity occurs, after which the edges of the tube blank are disposed in overlapping relation and forged together by being passed between a pair of forge rolls which also function to reduce the total thickness of the overlapped portion substantially to the original single thickness of the metal being welded, the edge portions of the tube blank are then joined together by a blap weld, the interface of which extends diagonally. Since in a butt welded tube seam, if the stresses thereon are tensional stresses, it will be apparent that the strength of the butt weld, which is limited by the dimensions thereof, will be restricted by the thickness of the strip material from which the tube is being formed. On the other hand, when a diagonal joint is provided, as in accordance with the invention, a greater weld area exists with a resultant greater strength weld.

Other advantages of a diagonal or blap weld over a butt weld include the reduction of the likelihood of entrapment of impurities, such as oxides or carbides, because the pressure of the forge rolls tends to squeeze out impurities whereas such pressures exerted on a butt weld would be ineffective. Such impurities as are entrapped will be distributed over a much wider area in a blap diagonal weld, and therefore the concentration per unit area is much less than in a butt weld. Also, internal pressure within a tube would put a butt weld in pure tension with a much greater chance of low strength and ductility than for a blap weld where the diagonal plane is in shear with a related much greater opportunity to exhibit full ductility and an associated high strength. Further, control of a tube diameter from a slit strip having a normal variation in width from normal slitting tolerances is much easier with a blap weld, wherein the overlap can vary, than in a butt weld which requires abutting edges.

A further object of the invention is to provide a blap weld suitable for the formation of a seam of a tube in a tube forming process, the weld area being restricted to a very narrow area by the heating of the edges of the tube blank to the desired forging plastic state through radio frequency heating means so that the heated area is confined to an extreme edge portion of the tube blank, and the edge portions are disposed in overlapped relation and passed between a pair of forge rolls, which forge rolls work the seam to reduce the thickness thereof and to refine the grain structure of the seam in the weld area through the reduction of the crystal size due to the high temperature deformation resulting from the pressure exerted thereon, whereby a relatively homogeneous grain structure generally devoid of weld nuggets (regions molten at the time of welding and then recrystallized and normally hard and brittle due to the absorption of excess quantities of carbon) is provided, thus eliminating brittleness and weaknesses in the tube in the area of the blap weld.

Although the blap weld, which is the subject of this invention, has general utility in the field of thin walled tubing, it has specific application to the forming of can bodies, which are formed of thin metal generally varying in thickness from 0.004 inch to 0.011 inch. At the present time, can bodies are customarily made from sheet metal by first forming body blanks, which are then passed in succession through a forming apparatus arranged to fold each blank in circular tubular form, and to secure the thenformed tube either by a longitudinal seam, which is a lapped seam, or a lock seam, each of which is soldered, or which is a welded butt or lap seam. Due to the extreme care necessary to insure fully hermetically tight seams, the rate of output of existing body making apparatus is usually in the order of 400 cans per minute. This is the production rate for a soldering operation. When the joint is sealed with an organic cement, the operation proceeds at a lower speed, and if welding is employed, which necessitates the one-at-a-time operation used until the present invention, the operation proceeds even more slowly.

The present lock seam used in the formation of can bodies has a number of disadvantages. In the first place, additional material is required in the formation of the can body in that there is an overlapping of the material in the formation of the seam, in the form of overlapping hook sections with or without overlapping tabs. Secondly, the seam must be altered at the ends thereof from a lock seam to a lap seam so that the thickness may be reduced from four to two times the material thickness to permit a can end to be secured to the can body by the conventional double seam. Further, the cost of the solder in the solder joint becomes an appreciable one when millions of cans are involved. In addition to these deficiencies of the usual lock seam, under present methods of forming can bodies, the juncture of the joined edges results in protrusions, both interiorly and exteriorly of the can, or reentrant cavities at the point of juncture, which make difficult the satisfactory subsequent treatment of the can bodies, as for example, by lacquering.

When decorated can bodies are being formed, it is less costly to apply the decoration to the blank prior to forming. In known methods of forming the seam in can bodies, primarily because of the heat problem, it is necessary that the decorations terminate a considerable distance from the seam, thus preventing a relatively wide gap in the decoration which, of course, is undesirable.

In view of the foregoing, it is another object of the invention to devise a novel method of forming can bodies wherein the can bodies may be formed at a much higher rate than is presently possible, and which can bodies are at least equal in strength and hermetic tightness to the quality of the present can bodies. In accordance with the invention, it is proposed to provide the can bodies by first forming a continuous tube having a blap welded seam, the tube, after the formation of the seam, being separable into can bodies of the desired length.

In the formation of a can body, in order to facilitate the joining of can ends to opposite ends of the can body, it is necessary that the ends of the can body be flanged. This may be readily done with the low carbon steels which are used at the present time in the formation of can bodies. However, in the formation of conventional welds, as is necessitated in a welded seam, the temperatures involved result in the existence of molten material and the flow of carbon within the weld area, together with the reception of foreign matter which may exist on the surfaces of the blank in the weld area, to produce a relatively hard crystalline structure in the weld area. When attempts are made to flange the can body with a welded seam, a large percentage of the can bodies have cracked in the area of the seam. This is particularly true in can bodies formed of thin walled material.

In view of the foregoing, it is a further object of the invention to provide improved tubing for forming a can body having a blap welded seam wherein the material in the area of the seam is homogeneous for all practical purposes and does not materially differ from the material adjacent the seam area in either hardness or ductility, even though there is some increase in hardness and some decrease in ductility, so that the can body so formed may readily be flanged without cracking in the seam area.

Another object of the invention is to provide a blap welded seam for tubing which is of a sufficiently thin wall whereby it is practical for use in the formation of can bodies, the seam weld being formed by heating to plasticity edges of the tube blank, which are then disposed in overlapped relation and forge welded together, the heating being accomplished by radio frequency heating means and being limited to a vary narrow portion along the adjacent edges of the tubing blank, whereby the desired ornamentation may be placed on the tube blank prior to the formation thereof into a tube and the subsequent formation thereof into a can body. Further, by restricting the heated area to a very small width, the ornamentation may be extended about a greater portion of the can body than is now feasible.

A still further object of the invention is to provide a novel metal tubing for forming a can body which has a blap welded seam, the welded seam being formed by a forge welding process which includes the heating of edge portions only of a tube blank until a forgeability plasticity temperature is reached, after which the edge portions are disposed in overlapped relation and forge welded together with a resultant reduction in cross-section of the tube in the weld area and the finishing of the welded seam so that protrusions or unwelded notches on either surface of the weld area are eliminated, together with an elimination of unwelded sections at the locations where the weld diagonal interface intersects the surfaces of the can body, thus providing interior and exterior surfaces which are suitable for the intended purpose without treatment, other than the normal interior lacquering.

A still further object of the invention is to provide a novel blap welded joint between thin low carbon steel sheet portions wherein the welded joint includes a diagonal weld interface having interlocking ferrite crystal growth across the weld juncture which was formed at a temperature below the melting temperature of the steel, inner zones of heat affected areas adjacent the interface being formed of large grained ferrite having a complete solution of carbides and the subsequent development of volumes of pearlite, and other zones of heat affected areas being formed of smaller grained ferrite having grain growth with a partial solution of carbides in austenite, which upon rapid cooling transforms to fine pearlite and the sheet portions outside of the heat affected areas having no visual change.

Yet another object of the invention is to provide a novel method of welding together thin sheet metal portions having a thickness in the order of 0.004 to 0.011 inch with a lapped seam having a diagonal blap weld juncture and wherein the thickness of the seam is generally the same as the thickness of a single sheet portion, the method including the advancing of the sheet portions at a high rate in the vicinity of 300 feet per minute or higher and simultaneously heating the edge portions of the sheets to a forge welding temperature by maintaining a flow of high frequency electrical current through the edge portions as the edge portions of the sheet metal are brought into overlying lapped relation, and finally applying forging pressure to the heated lapped edge portions to simultaneously forge weld together the edge portions and to flow the metal of the edge portions to shift the blap weld juncture to a diagonal position and reduce the total thickness of the lapped edges.

Still another object of the invention is to provide a novel blap weld which has a diagonal juncture and the thickness of the weld area being generally the same as the thickness of the material welded together, the weld being primarily suitable for use in forming tube seams and being readily adaptable to numerous metals including uncoated steels; steel coated with tin, zinc, stainless steel, titanium, zirconium, aluminum, cadmium, copper, brass, nickel, chromium and the like; other base metals such as aluminum, copper, brass, nickel; aluminum alloys and nickel base alloys; as well as enameled sheets of the foregoing metals.

With the above, and other objects in view that will hereinafter appear, the nature of the invention will be more clearly understood by reference by the following detailed description, the appended claims, and the several views illustrated in the accompanying drawings.

IN THE DRAWINGS

FIG. 1 is a schematic perspective view of example apparatus for carrying out the invention for the blap welding of tubing as an example, the tubing being suitable for making cans, as set forth above.

FIG. 2 is a sectional view on a reduced scale showing the general cross-section of the tubing blank prior to the initiation of the blap welding operation.

FIG. 3 is a sectional view on a reduced scale of the tubing during an intermediate stage of heating and shows generally the heated zones.

FIG. 4 is a vertical sectional view on a reduced scale showing the tubing with the edge portions thereof overlapped prior to forging.

FIG. 5 is an enlarged fragmentary sectional view showing the tubing passing between a pair of forging rolls.

FIG. 15 is a perspective view of a can body formed in accordance with the invention.

FIG. 16 is an enlarged representation of a photomicrograph of a section taken through a well-known mash seam weld.

Figure 6:
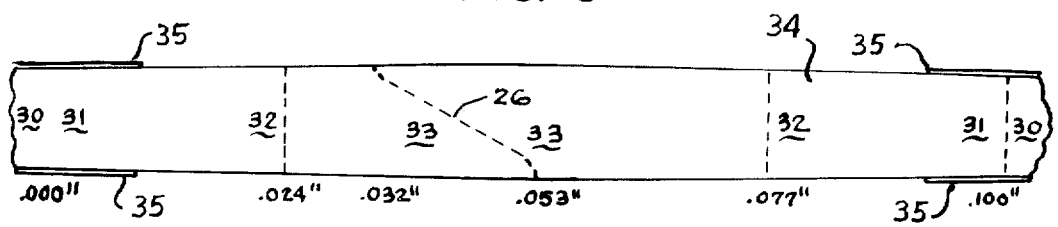
FIG. 6 is an enlarged fragmentary schematic cross-sectional view taken through the tubing formed from tinplated steel in the area of the blap weld with the various heat zones indicated thereon.

The present invention may be best understood by first considering the general steps involved in forming the subject weld. Although the invention may be applied equally as well to thin metal strip of all types, including a seam between two initially separate and independent strips, under most conditions the weld will be formed in connection with tubing. The tubing may be shaped in any desired manner to have the form of an unseamed tube. At this time, the edges of the tube blank are disposed in opposed slightly spaced relation. The tubing is then further shaped by suitable forming rolls so as to have the edges of the tubing blank converge in a V pattern with one of the tubing blank edges passing over the other into slightly overlapping relation. In the general V area, the edge portions of the tube blank are electrically heated to a temperature whereat the edge portions are in a forgeable plastic state. The maximum temperature of the edge portions is approximately at the apex of the V area. Immediately following the overlapping of the edges of the tube blank, the overlapped edges are passed between a pair of opposed forging rolls which apply sufficient pressure to the heated edge portions to form a forge weld therebetween. In the formation of the forge weld, the heated edge portions are also forged so as to reduce the double thickness of the overlapped edge portions to approximately the single thickness of the tube blank.

Referring now to FIG. 1 of the drawing in particular, the tube blank is referred to by the letter B and includes a pair of edges 5 and 6. The tube blank B is in the form of an unseamed tube with the edges 5 and 6 spaced apart and generally in opposed relation.

The tube edges 5 and 6 are maintained in spaced relation by an insulated spacing wheel W, and the edges are caused to converge and move into overlying lapped relation by a pair of forming guides or rolls 7 and 8. The overlapped relationship of the tube edges 5 and 6 is best shown in FIG. 4. As the tube edges 5 and 6 converge, they define a V area 9 having an apex, as at 10, at which point the tube edge 6 begins to move into overlapping relation with respect to the tube edge 5. The length of the V area 9 will vary depending upon the particular means provided for heating the edge portions of the tube blank B.

The forming guides 7 and 8 are disposed on opposite sides of the tube blank B, which is now shaped to be in the form of tube T, in the vicinity of the apex 10, the forming guides 7 and 8 cooperating to bring about the overlapping of the tube edge 6 relative to the tube edge 5 and at the same time retaining the circular cross-section of the tube. The forming guides have been illustrated as being of the hour-glass type, this shape being very suitable for the proper supporting and shaping of the tube T.

The heating of the edge portions 5 and 6 of the tube blank takes place in the V area 9. The heating of the edge portions may be accomplished in numerous different manners, and for the purpose of the present invention, only an illustrative heating unit, generally referred to by the numeral 11, will be described. The heating of the tube edge portions 5 and 6 may be accomplished by a radio frequency type heater, which includes a high frequency generator 12 connected to a pair of insulated conductive contacts 13 and 14 by leads 15 and 16, respectively. The contacts 13 and 14 will be disposed along the tube edges 5 and 6, as is clearly illustrated in FIG. 1. The heating unit 11 may also include a magnetic core formed of a plurality of magnetic rods 17 which are mounted within the tube T in the area of the contacts 13 and 14 in any suitable manner, the magnetic rods cooperating with the contacts to produce the desired electrical heating of the tube edges 5 and 6. At the present time, the frequency of the high frequency generator 12 is in the vicinity of 450 kc. However, it has been found that frequencies as low as 10 kc will produce the desired weld.

In accordance with the invention, it is proposed that for practical purposes, the heating of the tube blank B be limited to the extreme edge portions, with the width of the heated areas being very small. It is also proposed that the temperature of the heated edge portions at a maximum be less than the temperature at which the metal of the tube blank B melts, but at the same time at a temperature at which the metal will be in a forgeable plastic state. The arrangement of the contacts 13 and 14 will be such that the maximum temperature of the tube blank edges will occur approximately at the apex 10.

After the edge portions of the tube blank B have been heated to a plastic temperature, and the edges 5 and 6 overlapped, the overlapped edges 5 and 6 are passed between a pair of forging rolls 18 and 19. The forging roll 18 is disposed uppermost and is supported by a suitable support 20 for rotation. The forging roll 19 is disposed within the tube T and is supported by a support 21 which is suitably supported by an elongated arm 22 which extends to a point in advance of the forming area for the tube blank B, where it is suitably supported. If desired, a back-up roll 23 may oppose the forging roll 19 and engage the bottom part of the tube T. A second back-up roll 24 may engage the side of the tube T exteriorly thereof and in opposed relation to the back-up roll 23 to support the back-up roll 23 through the metal of the tube T. The back-up roll 24 is carried by a suitable support 25.

The amount of overlap of the edge portions of the tube blank B will vary depending upon the thickness of the metal sheet and normally will be in the vicinity of 0.020 inch, the amount of overlap being sufficient to assure a proper joint between the tube edges 5 and 6, notwithstanding variations in the edge due to camber in the strip of material from which the tube blank is formed, and deficiencies in guidance.

Due to the overlapping of the edges 5 and 6, as the tube T passes between the forging rolls 18 and 19, a double thickness of material is presented. The pressure which may be applied to the lapped portions of the tube T by the forging rolls 18 and 19 will be such that the edges 5 and 6 will be forge welded together and the metal adjacent the edges 5 and 6 will be reworked so that the interface of the weld will be diagonally disposed. This is best illustrated in FIGS. 5 and 6, with the interface of the weld being referred to by the numeral 26. At the same time, the thickness of the tube T in the weld area will be reduced to approximately the normal thickness t of the tube blank B. In order to assure proper working of the metal of the tube T in the weld area, the forging roll 18 is provided with a concave tube-engaging surface 27 and the forging roll 19 is provided with a convex tube-engaging surface 28. The radius or curvature of the tube engaging surface 27 may correspond to the nominal exterior radius of the tube T and the tube engaging surface 28 correspond to the nominal internal radius of the tube T. Although a final thickness of the tube T in the weld area under optimum conditions would be one t, this thickness may vary from 1.0 t to 1.5 t, depending upon operating conditions, t being the nominal thickness of the tube blank. The length of the interface 26, identified by the letter 1, will be approximately two t, as is indicated in FIG. 5.

Although rigid controls are required in the formation of an acceptable continuous seam weld, a number of possibilities, as to structure, are presented. Several different types of high frequency heaters may be utilized, the requirement of the heating means being that the desired plastic forging condition of the edge portions of the tube blank B be maintained at all times and that the heated areas be restricted. The width of the heated area is particularly critical in that in the formation of can bodies, in many instances, suitable decorations are placed on the can bodies. The decoration of the can body usually occurs prior to the formation of the can body, since it is less costly to decorate in the flat. Accordingly, when the tube T is to be used in the formation of decorative can bodies, the tube blank B will be decorated in advance. Excess heat in the tube blank B would damage the decorative coating. Furthermore, too wide of a heated area would provide too great a space between the decorative areas in the vicinith of the welded seam.

It is necessary that the heating of the edges of the tube blank B be so controlled as to exclude the possibility of the inclusion of molten areas. In this manner, the weld structure will involve only a recrystallized structure at and surrounding the interface or juncture 26. Further, by properly heating the edge portion of the tube blank B through a proper current distribution, the resultant weld structure is metallurgically macro-homogeneous throughout the heat affected zone and devoid of weld nuggets. When such a weld is formed, the tube T has no weakened areas on opposite sides of the interface 26. Further, because the juncture 26 is diagonally disposed, a much wider weld area is obtained than that which would be obtained through a butt weld. When the welded joint is in tension, the larger the weld area, the greater the strength of the weld.

The blap weld formed in accordance with the invention is particularly acceptable for thin walled tubing, such as that required in the formation of can bodies. The blap weld is particularly adaptable to tubes having a wall thickness ranging from 0.004 inch to 0.011 inch. Thousands of tubes incorporating the subject weld have been fabricated under laboratory conditions, and tests prove that the blap weld is a commercially feasible one for thin walled tubes.

Although the finished tube T is primarily intended for use in the formation of can bodies, the subject weld may be used in the formation of thin walled tubes for other purposes. When the tube T is to be utilized in the formation of can bodies, suitable means will be provided for separating the continuous tube T into short lengths, as is required for the individual can body. Due to the fact that the blap weld is metallurgically homogeneous, the individual can body may more readily be flanged for the addition of can ends in the normal double seaming process without cracking of the can body in the welded area than heretofore possible with can bodies having conventionally welded seams. Since the edges of the metal to be joined together are preheated prior to forging, there is a burning away of much of the surface contamination. In addition to these factors, the welding speed of the present weld is relatively high, with a resulting shorter duration of the heating cycle, thus minimizing the structural changes in the zone of the weld.

A schematic representation of a sample blap weld structure is illustrated in FIG. 6. The weld was formed in a tube shape from can makers quality (CMQ) MR-T30.009 electrotin plate having a 0.000015 inch tin plating on opposite surfaces thereof. The weld was formed at the rate of approximately 340 feet per minute.

A metallographic examination of the sample weld indicated the existence of areas of no visible changes, which are indicated by the reference numeral 30, separated by an intermediate heat affected area. The heat affected area is divided into a plurality of general zones. The zones at the extreme outer edges of the heat affected area are identified by the numeral 31, the zones adjacent the weld interface zone are identified by the numeral 33, and the zones intermediate the pairs of zones 31 and 33 are identified by the numeral 32. The photomicrographic view of FIG. 7 extends generally between and including parts of the zones 31, as well as the zones 32 and 33 and the weld interface or juncture disposed therebetween. The grain structures of the metal area 30 and the zones 31, 32 and 33 are best shown in the enlarged photomicrographic views of FIGS. 8-11, respectively.

In FIG. 6, the base steel strip is referred to by the numeral 34 and the tin coatings are referred to by the numeral 35. The tin coatings 35 remain on the steel strip 34 about ⅛ inch from the blap weld, but adjacent and at the blap weld, the tin coatings melted, oxidized and were removed by the forging operation.

Figure 8:
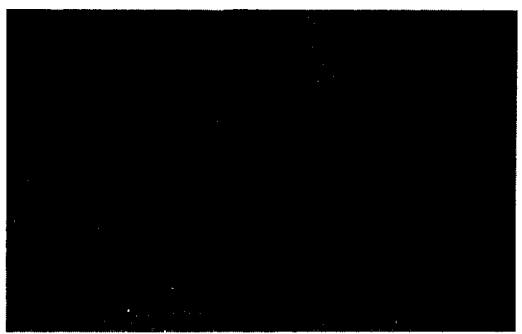
FIGS. 8, 9, 10 and 11 are enlarged photomicrographic views showing the grain structure, magnified 500 times, of the metal in the various heat zones of the example of FIG. 6.

Considering the photomicrographic view of FIG. 8, showing the grain structure of the metal of the areas 30 where there is no visible change, it will be seen that the structure consists of equi-axed grains of ferrite, some coarsely spheroidized carbides or $Fe_3C$, and a few elongated crystals of non-metallic inclusions. Just at the edge of the heat affected zone 31, a temperature was reached equivalent to at least 1,370 degrees F. for ten seconds. Therefore, metal in the areas 30 was heated for milliseconds to temperatures up to the equivalent of 1,300–1,400 degrees F. In this very short time, no visible ferrite grain growth occurred nor was there any visible dissolution of submicroscopic carbides, $Fe_3C$, to increase the carbon dissolved in ferrite from 0.006% to 0.02%, which theoretically should occur.

Figure 9:
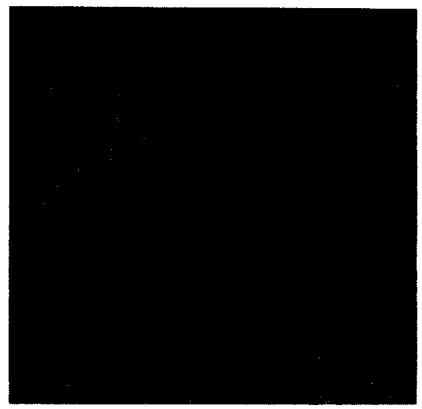

In the zone 31, as is best shown in FIG. 9, there is a partial solution of carbides in austenite. The first visible effect of heating is a narrow black zone around each particle of $Fe_3C$. This corresponds to the initiation of the eutectoid reaction upon heating, viz.:

(ferrite) + $Fe_3C$     (austenite)

This reaction must start at the interface or boundary between the ferrite and carbide. Upon extremely slow heating, the reaction takes place at 1,330 degrees F. Heating at usual rates, e.g., 100 degrees F. per minute, raises the starting temperature to about 1,370 degrees F. Heating from 70 degrees F. to 2,000 degrees F. in milliseconds would raise this temperature much more and therefore the temperature when reaction occurs can be in the vicinity of 1,500 degrees F. There is some increase in the grain size of the ferrite matrix, but the grain growth is not marked. The matrix metal remains ferrite at the maximum temperature attained.

Figure 10:

In zones 32, as is best shown in FIG. 10, there is a nearly complete solution of carbides and diffusion of carbon in austenite. Some small carbide particles remain undissolved in the midst of the large, roughly spherical (in three-dimensions) volumes of austenite containing dissolved carbon. The temperature was in excess of 1,600 degrees F., equivalent for ten seconds. The ferrite grains size here is still larger than in zone 31. It is probable that the background matrix was still ferrite at the top temperature attained even though this temperature is above the equilibrium temperature of the transformation on heating of ferrite into austenite.

Figure 11:
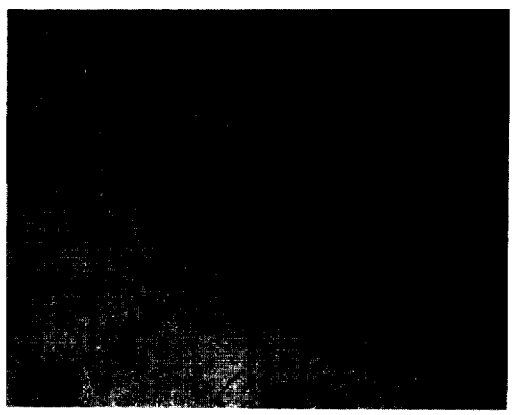

In zone 33 as shown in FIG. 11, there is a complete solution of carbides, in this zone adjacent to the blap interface, all carbide or $Fe_3C$ was dissolved in austenite and all of the ferrite matrix (background) changed to austenite at the temperature attained. However, even though at the attained temperature the structure was completely austenite, the dissolved carbon is not uniformly distributed to form a homogeneous solution. Instead, carbon-rich areas of spherical shape occur where originally there had been $Fe_3C$ crystals. It would appear that the temperature equivalence here was as least 1,700 degrees F. (for ten seconds). There is certainty from the microstructure that melting did not occur. The austenite became moderately coarse grained. After the weld was made by forging, upon cooling, the low carbon austenite transformed back to ferrite which is coarser grained than elsewhere in the structure. The higher carbon content spheroidal volumes of austenite transformed into very fine grained pearlite by the eutectoid transformation on cooling:

(austenite) (ferrite) + Fe$_3$C

The reaction in each nodular unit started in the center which was of higher carbon content (Fe$_3$C must form first to nucleate the eutectoid reaction). The reaction released heat which caused it to slow up so that the outer edges of the nodules which were last to transform show coarser pearlite, evident by visual carbide lamellae.

Even when the weld area is enlarged many times, the interface or weld juncture is not visible as such since single ferrite crystals occupy areas on both sides of the line or have grown across the surface of the interface, thereby destroying direct visual evidence of any juncture. The evidence locating the juncture, when visible, consists of:
 (a) Some difference in appearance of the pearlite transformation nodules on either side of the assumed interface location, a difference attributable to some difference in temperature at the instant of welding.
 (b) One or two non-metallic inclusions are changed in orientation, from the original uniform parallelism to the surface to a diagonal direction.
 (c) Some slight evidence of a lower carbon content along the zone, presumably because of reaction or burning of carbon with oxygen or FeO formed during heating.
 (d) A slight discontinuity at inner and outer surfaces of the tube where these surfaces are intersected by the weld juncture.
 (e) The ferrite grain size differs on the two opposite sides of the weld diagonal due to a differential in temperature of the two surfaces on opposite sides of the weld diagonal at the time of forging.

The foregoing is typical of the results obtained with hundreds of tests on various types of metals. In all instances of successful blap welds, the weld area is devoid of weld nuggets, there being no visual evidence of melting of the metal during the heating and forge welding operation.

Figure 12:
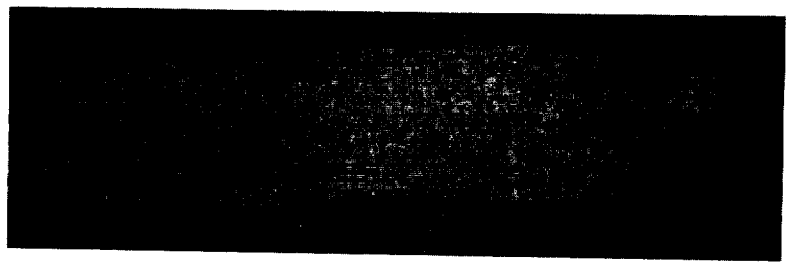
FIGS. 12, 13 and 14 are photomicrographic views similar to FIG. 7 showing the grain structures, magnified 125 times, of the metals of examples of differently coated steel strips in the areas of the welds thereof.

The photomicrographic view of FIG. 12 is enlarged 125 times and shows the grain structure of a blap welded 0.009 inch MR-T3 steel strip having 0.000060 inch tin coating on the upper surface and a 0.000015 inch tin coating on the lower surface. This photomicrograph shows the structure of a relatively "cool" weld for both edges. The evidence for this is the relatively fine grained structure in the weld where the deformation upon forging has refined (recrystallized) the grain structure but the temperature was too low for subsequent grain growth. Note the coarser grain structure just outside the blap on the right side where grain refinemant by forging did not occur. No FeSn$_2$ or other evidence of the tin is present; all of the tin and iron-tin alloy was liquid at welding temperature and was expelled from the blap by forging pressure. Likewise, these liquids were removed from the exterior and interior surfaces by the forging rolls. The blap line cannot be seen directly but is inferentially evident from the two surfaces since forging of the two relatively cool edges, e.g., 1,800 to 2,000 degrees F., which therefore were harder, did not forge down completely to parent stock thickness.

The foregoing has been restricted to a specific discussion of the welding characteristics of a tin plated steel, such as can makers quality (CMQ) electrotin plate. Blap welds of the desired quality can also be made with steel coated with metals such as aluninum, brass, cadmium, copper, lead, zinc, chromium, cobalt, manganese, nickel, stainless steel, titanium and zirconium. However, tin plated steel is the most widely used in the can making industry.

Coatings of aluminum, brass, cadmium, copper, lead and zinc or alloys of these with iron act as described above with respect to tin, and all are liquid adjacent the weld area at the moment of overlapping of the edges of the unseamed tube and forging the blap weld. Forging roll pressure during the formation of the blap weld squeezes the liquid metal out of the joint and permits the formation of a true weld of steel-to-stell.

A table relating to the melting points of the metals of the above paragraph and alloys thereof is as follows:

Metals and alloys thereof with iron whose melting points are more than 300° C. below that of iron

| Metal or Compound | | Melting Point | Below Fe (1,539° C.) |
|---|---|---|---|
| Sn | | 231° C. | −1308° C. |
| — | FeSn$_2$ | 496 | −1043 |
| — | FeSn | 800 | −739 |
| — | Fe$_2$Sn | 900 | −639 |
| Zn | | 419 | −1120 |
| — | (FeZn$_{13}$) | 530 | −1009 |
| — | (Fe$_2$Zn$_{13}$) | 672 | −867 |
| — | (Fe$_3$Zn$_{10}$) | 782 | −757 |
| Cd | (no compounds)* | 321 | −1218 |
| Pb | (no compounds)* | 327 | −1212 |
| Al | | 660 | −879 |
| — | FeAl$_2$ | 1165 | −374 |
| — | Fe$_2$Al$_5$ | 1170 | −369 |
| — | FeAl$_3$ | 1160 | −379 |
| Cu | | 1083 | −456 |
| Cu-Zn | (Brass) | 903–1050 | −636 to −489 |

*Note
These elements are essentially insoluble in solid Fe.

The chromium, cobalt, manganese, nickel, stainless steel, titanium and zirconium coatings are solid during the welding operation. The pressure and deformation involved in forming the blap weld break up oxide films and permit welding, but not of base steel to base steel. There is, however, evidence of alloying material along the weld interface.

A table relating to the melting points of the metals of the above paragraph and alloys thereof is as follows:

Metals and alloys thereof with iron whose melting points are within 300° C. of that of iron

| Metal or Compound | | Melting Point | Difference from Fe (1539) |
|---|---|---|---|
| Ti | | 1820° C. | +281° C. |
| — | Fe$_2$Ti | 1530 | −9 |
| — | FeTi | above 1600 | +61 |
| Zr | | 1750 | +211 |
| — | Fe$_3$Zr$_2$ | 1650 | +111 |
| Cr | (no compounds)* | 1800 | +261 |
| Co | (no compounds)* | 1495 | −44 |
| Mn | (no compounds)* | 1245 | −294 |
| Ni | (no compounds)* | 1455 | −84 |
| Stainless (18–8) | | 1400–1425 | −139 to −114 |

*Note
these elements are all completely soluble in solid iron but form no hard or brittle compounds therewith. The alloyed state in each case has favorable properties as compared to the base, iron.

The present invention, of course, is applicable to a plain low carbon steel, such as CMQ blackplate. The grain structure in the area of a blap weld in the plain low carbon steel will be the same as that discussed above with respect to tin plated steel in that during the welding operation on the tin plated steel, the tin is melted, oxidized and removed by the forging operation and in no way affects the grain structure of the steel.

Figure 13:
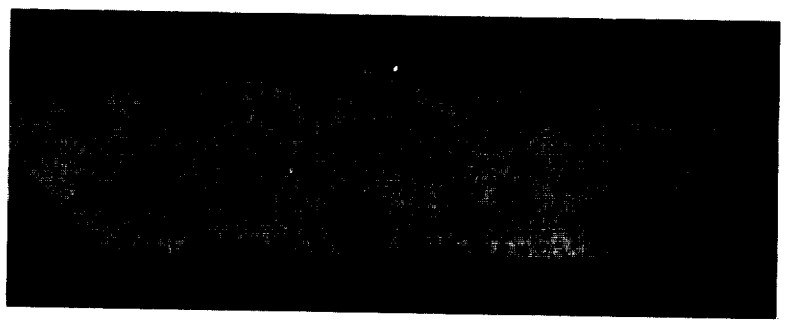

The photomicrographic view of FIG. 13 is enlarged 125 times and shows the grain structure of a blap welded 0.010 inch CMQ MR-T3 steel strip with a coating of oleoresinous enamel on the lower surface only. The enamel coating has not detrimentally affected the forming of the blap weld and the weld diagonal is not evident. However, the upper surface of the steel strip shows a "bump" which probably resulted from the soft weld metal filling an eroded zone in the upper forge roll.

Figure 14:

The photomicrographic view of FIG. 14 is enlarged 125 times and shows the grain structure of a blap welded 0.009 inch CMQ MR-T3 steel strip with a white enamel base coat on the outside or upper surface and an epon enamel coat on the inside or lower surface. The area shown is the center of the blap weld zone, but there is no readily visible evidence of the weld diagonal.

Figure 7:
FIG. 7 is a photomicrographic view showing the grain structure, magnified 50 times, of the metal of the example of FIG. 6 in the area of the weld.

A comparison of the transverse properties of the several examples disclosed hereinabove are found in the following table:

| Steel and Tin Plate Cans (Transverse Properties) | | | | | |
|---|---|---|---|---|---|
| | Parent Metal | | | Weld Segment | |
| | Strength (psi) | | % Elong. | Strength (psi) | | % Elong. |
| Sample | Tensile | Yield | 1" gage length | Tensile | Yield | 1" gage length |
| Fig. 7 | 53,000 | 44,100 | 22 | 54,700 | 48,300 | 10 |
| | 52,400 | 44,100 | 20 | 54,700 | 45,800 | 10 |
| Fig. 12 | 52,900 | 43,200 | 23 | 53,800 | 44,800 | 17 |
| | 52,700 | 42,700 | 23 | 53,500 | 43,800 | 17 |
| Fig. 13 | 50,400 | 40,100 | 24 | 52,400 | 43,300 | 20 |
| | 50,300 | 39,300 | 24 | 52,400 | 42,900 | 21 |
| Fig. 14 | 49,600 | 41,300 | 19 | 50,500 | 42,300 | 15 |
| | 49,800 | 41,300 | 20 | 51,000 | 43,500 | 14 |

All of the tests were run on a 4 inch long specimen having a test width of 0.25 inch. All of the fractures were at least one specimen width (0.25 inch) away from the heat affected zone.

Typical values of the CMQ MR-T3 strip longitudinally of the strip are as follows:

| Tensile | Yield | % Elong. |
|---|---|---|
| 48,000-58,000 psi | 42,000-52,000 psi | 22-32 |

The noteworthy conclusions from the data of the above table are:

(1) All fractures of the tensilely loaded weld specimens took place at least ¼ inch away from the weld zone and therefore, in metal unaffected by the heat of welding.

(2) The weld metal is stronger than the parent sheet metal.

(3) The higher strengths exhibited by the weld specimens cannot be attributable to any effect of the weld but to the restraint offered by the stronger weld metal to uniform flow under tension.

(4) The apparently lower ductility of the weld specimens is also solely a result of the restraint offered by its greater strength, resulting in localizing flow to the area of fracture.

When the metal is enameled prior to welding, the enameling may be discontinued spaced from the edges to be welded, or if desired, the entire metal strip may be enameled. When the entire strip of steel is enameled, a very fine grain ferrite is present along almost the entire length of the weld interface and has a width of 0.002 to 0.004 inch. Grain growth adjacent to the interface is evidently prevented by shallow carburization of the grain boundaries by the thermal decomposition products of the enamel. The fine grained interfacial ferrite is not expected to be detrimental and the weld structure is normal otherwise.

A comparison of the transverse properties of blap welded aluminum can bodies is found in the following table:

| | | Parent Metal | | | Weld Segment | | | |
|---|---|---|---|---|---|---|---|---|
| | | | | | | | % Elongation | |
| Sample Alloy & Gauge | | strength (psi) | | % Elong. Length | strength (psi) | | 1" gage length | ¼" gage length across weld |
| | | Tensile | Yield | 1" gage | Tensile | Yield | | |
| #3003 | .008" | (1) 21,100 | 18,600 | 0.5 | 16,300 | 15,300 | 1 | 4 |
| | | (2) 19,100 | 18,100 | 1 | 17,700 | 15,800 | 2 | 8 |
| #5052 | .008" | (1) 43,700 | 37,200 | 5 | 31,800 | 29,600 | 1 | 2 |
| | | (2) 43,200 | 37,200 | 5 | 33,700 | 30,500 | 1 | 4 |
| #5154 | .008" | (1) 49,600 | 40,700 | 6 | 41,900 | 37,000 | 2 | 4 |
| | | (2) 48,500 | 39,700 | 6 | 42,400 | 36,400 | 2.5 | 10 |

All of the tests of the above table were run on 4 inch long specimen having a test width of 0.25 inch. All specimens broke at the edge of what appeared to be an upset area.

The data of the table on blap welded aluminum differs materially from that on steel since the alloys concerned were all work hardened and the sole effect of welding heat is to soften the structure. There is no thermal hardening of these alloys. In all cases, these blap welded aluminum tubes could be successfully converted to can bodies by being cut to length, flanged and having ends seamed on by conventional means.

Other base metals and alloys have been welded in the described manner. Tests indicate that aluminum alloys, copper, brass, nickel, and nickel base alloys may be welded utilizing a blap weld. Particular success has been had with 3003 aluminum alloy which is well adapted for the making of can bodies. Extensive test have also been run on 5052 and 5154 aluminum.

When it is desired to produce a blap welded joint in melts other than steel or coated steel, and these metals have appreciably different melting points and electrical resistivities, it has been found desirable to alter the frequency of the elctrical heating means. For example, when welding aluminum alloys to the procedures herein described, a frequency of 450 kilocycles causes too localized a heating effect and, as a result, the skin of the edge of the thin gauged aluminum alloy stock melts before the center of thickness of this edge reaches forging temperature. This in turn makes it impossible to attain a true blap weld, i.e., forge welded, diagonal joint showing no trace of melting. Reducing the frequency of the electrical heating means to below about 100 kilocycles makes it possible to attain a blap weld of the aluminum alloys. Similar adjustments must be made for other different metals such as copper alloys.

As set forth in the foregoing, when the tube T is to be used in the forming of can bodies, the tube T is cut off in any suitable manner to can body lengths, after which the ends of the short lengths of the tube are flanged at the opposite ends thereof to form can bodies, such as the can body 40 illustrated in FIG. 15. Although the apparatus illustrated is primarily adapted for welding a continuous seam in an elongated tube, it is within the realm of the present invention to similarly weld single can body lengths.

Heretofore, attempts have been made to form welded seams in can bodies by forming mash seam welds. This process utilizes roller electrodes between which lapped edges of an unseamed tube are passed. The roller electrodes are pressure urged together and as the metal softens during the welded process, the roller electrodes function as forging rolls to mash or forge the seam to reduce the thickness thereof. Such a weld approaches the blap weld disclosed herein, but has many deficiencies which the blap weld overcomes. The most important of these are the limited rate at which a mash seam weld may be produced and the necessary of forming weld nuggets to produce the desired strength of weld. The weld nuggets are clearly defined in the photomicrograph representation of FIG. 16, taken from the article "Electrical and Metallurgical Characteristics of Mash Seam Welds" by Funk and Begeman, as appearing in the June, 1956, Supplement to the "Welding Journal", beginning on page 265-S. When a proper mash seam weld is formed, there exist along the weld interface a plurality of weld nuggets 39 which result in localized hardness and brittleness which, in many instances, result in the cracking of the can body during flanging and seaming operations. This same type of weld nugget appears in all seam welds wherein there is a melting of the metal.

Comparing the blap weld with fusion welds, it is to be noted that fusion welds of thin strip are difficult to produce and when produced, inevitably contain some pores, resulting from the shrinkage upon solidification of all metals available in the form of strip and also from the release of gases during solidification. Furthermore, there is a structural difference readily observed by reason of the dendritic form of solidification of metal. Both the porosity and the dendritic structure result in fusion welds being somewhat weaker than the base metal, in contrast to the blap weld of the present invention.

From the foregoing, it will be seen that novel and advantageos provision has been made for carrying out the desired end. However, attention is again directed to the fact that variations may be made in the example method and apparatus disclosed herein without departing from the spirit and scope of the invention as defined in the appended claims.

We claim:

1. A welded joint between thin metal sheet portions, said joint including a diagonal weld interface, the welded area being devoid of weld nuggets, and only the edge portions of said metal sheet portions being visibly microstructurally heat affected, said sheet portions having a thickness ranging from 0.004 to 0.011 inch and the width of said heat affected area being approximately 0.150 inch.

2. A low carbon steel tube having a welded seam, each tube having a maximum thickness of 0.011 inch, said seam including a diagonal weld interface with interlocking ferrite crystal growths across said weld interface resulting from the formation of the weld at a temperature below the melting temperature of the steel and only edge portions of said sheet portions being visibly microstructurally heat affected, inner zones of said heat affected area adjacent said weld interface being comprised of large grain ferrite having a complete solution of carbides into volumes of pearlite, and outer zones of said heat affected area comprised of smaller grain ferrite having had grain growth with a partial solution of carbides in austenite, and said tube outside of said heat affected area having no visual change.

3. A tube formed from a metal coated low carbon steel strip, wherein the metal coating is capable of melting during the welding of the steel strip, said tube having a maximum thickness of 0.011 inch, strip, said tube having a welded seam, said seam including a diagonal weld interface with interlocking ferrite crystal growths across said weld interface resulting from the formation of the weld at a temperature below the melting temperature of the steel and only edge portions of said sheet portions being visibly microstructurally heat affected inner zones of said heat affected area adjacent said weld interface being comprised of large grain ferrite having a complete solution of carbides into volumes of pearlite, and outer zones of said heat affected area being comprised of smaller grain ferrite having had grain growth with a partial solution of carbides in austenite, said metal coating having been melted from said heat affected area, said diagonal weld interface being free of the coating metal, and said tube outside of said heat affected area having no visual change.

4. A low carbon steel can body having flanged ends and an impervious welded seam, said can body having a wall thickness of from 0.004 to 0.011 inch, said welded seam including a diagonal weld interface with interlocking ferrite crystal growths across said weld interface resulting from the formation of the weld at a temperature below the melting temperature of the steel and only edge portions of said sheet portions being visibly microstructurally heat affected, inner zones of said heat affected area adjacent said weld interface being comprised of large grain ferrite having a complete solution of carbides into volumes of pearlite, and outer zones of said heat afffected area being comprised of smaller grain ferrite having had grain growth with a partial solution of carbides in austenite, said can body outside of said heat affected area having no visual change.

5. An aluminum alloy can body having flanged ends and an impervious welded seam, said can body having a wall thickness of from 0.004 to 0.011 inch, said welded seam having a diagonal weld interface with the metal in the weld area being generally metallurgically homogeneous, and the thickness of said can body in the seam area being generally the same as the thickness of adjacent portions of said can body.

6. An enamel coated can body having flanged ends and an impervious welded seam, said can body having a wall thickness of from 0.004 to 0.011 inch, said welded seam having a diagonal weld interface and the thickness of said can body in the seam area being generally the same as the thickness of adjacent portions of said can body, and there being a narrow band of fine grain ferrite along the weld interface resulting from the carburization of the grain boundaries by the thermal decomposition products of said enamel.

7. A metal coated steel can body having flanged ends and an impervious welded seam wherein the metal coating is of the type which is capable of melting during the welding of the can body, said can body having a wall thickness of from 0.004 to 0.011 inch, said welded seam including a diagonal weld interface with interlocking ferrite crystal growths across said weld interface resulting from the formation of the weld at a temperature below the melting temperature of the weld and only edge portions of said sheet portions being visibly microstructurally heat affected, inner zones of said heat affected area adjacent said weld interface being comprised of large grain ferrite having a complete solution of carbides into volumes of pearlite, and outer zones of said heat affected area being comprised of smaller grain ferrite having had grain growth with a partial solution of carbides in austenite, said metal coating having been melted from said heat affected area, said diagonal weld interface being free of the coating metal, and said can body outside of said heat affected area having no visual change.

8. A method of forming a tube with a continuous welded seam comprising the steps of feeding a metal tube blank of a generally circular cross-section and of a 0,011 inch maximum thickness with the edges of the tube blank in spaced relation, heating the edges only of the tube blank to a forge welding temperature while moving the tube blank edges into overlapping relations, and then simultaneously forge welding together the lapping edges and forging the weld area to reduce the thickness of the weld area to approximately the original thickness of the tube blank metal and to form a weld interface extending diagonally and substantially completely between the opposite surfaces of the tube.

9. A method of welding together with a lapped seam having a diagonal weld interface, adjacent portions of thin sheet metal having a thickness in the order of 0.004 to 0.011 inch, which method comprises advancing the sheet portions at the same high rate with a gap therebetween, simultaneously bringing edge portions of said sheet metal into overlying lapped relation while heating said edge portions to a forge welding temperature prior to overlapping thereof and while preventing visually detectable evidence of melting by maintaining a flow of high frequency electrical current through said edge portions, and applying pressure to said lapped edge portions to simultaneously forge weld together said edge portions and to flow the metal of said edge portions to shift the weld interface to a diagonal position and reduce the total thickness of the lapped edges to generally the thickness of a single sheet portion.

10. A welded joint of homogeneous sheet metal in the range of 0.004 to 0.011 inch in thickness differing from other welded joints by having a diagonal weld juncture, chemical macro homogeneity, uniformity of structure along the diagonal juncture from one external surface of the joint to the opposite surface, interlocking crystal growths across the juncture to obliterate substantially all location identifying characteristics of said juncture, uniformity of structure at any depth of the cross-section along the length of the welded joint, substantial uniformity of structure along the diagonal juncture, being devoid of weld nuggets of fused metal, having a visibly microstructurally heat affected zone no greater than 0.15 inch in width, and having the weld metal in the diagonal weld zone approaching the parent sheet metal in thickness.

11. The welded joint of claim 10 wherein the sheet metal is low carbon steel and said diagonal juncture shows large grained ferrite crystals with some included areas where a complete solution of carbides during heating and welding results in a subsequent development of volumes of pearlite, adjacent zones of incomplete solution of carbides and lesser size of ferrite grains, and further outside said zones, the original unaffected structure of the parent low carbon steel, said weld joint having a greater strength than that of the parent low carbon steel.

12. The welded joint of claim 11 wherein the low carbon steel initially had a thin coating of a metal with a melting point at least 300 degrees C. below that of the steel and, during welding, this coating metal and any intermediately disposed alloy between said coating metal and the low carbon steel has been melted and substantially expelled from the diagonal joint during the formation of said joint by pressure on the two lapped and heated edges from which the joint is formed.

13. Industrial product comprising two sheets of metal each having a maximum thickness of 0.011 inch and forge welded together by a lap weld at a temperature below the melting temperature of the metal wherein the line of the interface of the juxtaposed and welded together surfaces considered in transverse section lies diagonally in relation to the surfaces of the sheets and is invisible even when magnified one hundred times, the weld interface extending substantially entirely between opposite surfaces of the joint.

14. A method of forming a welded seam between adjacent edges of sheet metal each having a thickness of 0.011 inch and comprising the steps of feeding the sheet metal with edge portions thereof moving into overlapping relation, and while feeding the sheet metal, heating the edge portions to a forge welding temperature, and then forge welding together the lapped edge portions and reducing the thickness of the weld area to approximately the original thickness of the sheet metal to provide a weld extending substantially completely between opposite surfaces of the welded together sheet metal and having an interface which when considered in transverse section lies diagonally in relation to the surfaces of the sheet metal and is invisible even when magnified one hundred times.

15. An article of manufacture comprising two sheet steel metal portions each having a maximum thickness of 0.011 inch and forge welded together along a lapped seam and substantially completely between opposite surfaces of the seam at a temperature below the melting temperature of the metal the welded lapped seam extending, in cross-section, diagonally with respect to the surfaces of the sheet metal, the surfaces at the region of the lapped seam being approximately flush with the adjacent surfaces of the article and the particular line along which the meeting surfaces of the metal are welded together being unobservable upon etching a cross-section thereof and with magnification of the order of 100X.

16. A method of electrically welding together the edge portions of metal strip in overlapping relation which comprises moving the edge portions along predetermined paths in spaced, non-overlapping relation in advance of the desired weld point, moving the edge portions of the strip into overlapping relation at said weld point and maintaining electrical current of a frequency of the order of 100,000 cycles per second or higher at the edges of the strip in advance of the point where the edge portions are brought into overlapping relation.

17. A method of electrically welding together the edge portions of metal strip in overlapping relation which comprises moving the edge portions along predetermined paths in spaced, non-overlapping relation in advance of the desired weld point, moving the edge portions of the strip into overlapping relation at said weld point and maintaining electrical currents of a frequency of the order of 100,000 cycles per second or higher at the edges of the strip both in advance of and after the point where the edges are brought into overlapping relation.

18. A method of electrically welding together the edge portions of metal strip in overlapping relation which comprises moving the edge portions along predetermined paths in spaced, edge-to-edge relation in advance of the desired weld point, thereafter moving the edge portions of the strip into overlapping relation at a point immediately ahead of said weld point and maintaining electrical currents of a frequency of the order of 100,000 cycles per second or higher at the edges of the strip both in advance of and after said point where the edges are brought into overlapping relation.

19. The method of forming tubing with an electrically welded lapped seam comprising advancing a metal strip, forming said strip into a partially closed tube with spaced, non-overlapping edges and of a first predetermined radius at a first position, bringing the edge portions into overlapping relation at a second succeeding position while maintaining the edge portions in nonoverlapping relation intermediate said first and second positions, pressing said edge portions together at a third position succeeding said second position and maintaining high frequency currents having a frequency of the order of 100,000 cycles per second or higher on the edge portions during the movement thereof from said first to said third positions.

20. A method of electrically welding together the edge portions of metal strip in overlapping relation which comprises moving the edge portions along predetermined paths in spaced, nonoverlapping relation in advance of the desired weld point, moving the edge portions of the strip into overlapping relation at a point in advance of said weld point, forcing said edge portions together at the weld point and maintaining electrical currents of a frequency of the order of 100,000 cycles per second or higher at the edges of the strip from in advance of said point where the edge portions are brought into overlapping relation and up to the weld point.

21. A method of electrically welding together the edge portions of metal strip in overlapping relation which comprises moving the edge portions along predetermined paths in spaced, nonoverlapping relation in advance of the desired weld point, moving the edge portions of the strip into overlapping relation at a point in advance of said weld point, forcing said edge portions together at the weld point and maintaining electrical currents of a frequency of the order of 100,000 cycles per second or higher at the edges of the strip both in advance of and after said point where the edges are brought into overlapping relation.

22. A method of electrically welding together the edge portions of metal strip in overlapping relation which comprises moving the edge portions along predetermined paths in spaced, edge-to-edge relation in advance of the desired weld point, thereafter moving the edge portions of the strip into spaced overlapping relation at a point immediately ahead of said weld point and maintaining electrical currents of a frequency of the order of 100,000 cycles per second or higher at the edges of the strip both in advance of and after said point where the edges are brought into overlapping relation.

23. The method of forming tubing with an electrically welded lapped seam comprising advancing a metal strip, forming said strip into a partially closed tube with spaced, nonoverlapping edges and of a first predetermined radius at a first position, bringing the edge portions into spaced overlapping relation at a second succeeding position while maintaining the edge portions in nonoverlapping relation intermediate said first and second positions, pressing said edge portions together at a third position succeeding said second position and maintaining high-frequency currents having a frequency of the order of 100,000 cycles per second or higher on the edge portions during the movement thereof from said first to said third positions.

24. Apparatus for welding together metal edge portions with a lapped seam comprising means for advancing said edge portions, shoe means for maintaining said edge portions in edge-to-edge, nonoverlapping relation, lapping means following said shoe means for bringing said edge portions into spaced-apart, overlapping relation, means for pressing the overlapping edge portions together at a weld point, and means for supplying electrical heating current of a frequency of the order of 100,000 cycles per second or higher to said edge portions in advance of the position in which they are brought into overlapping relation.

25. Apparatus for welding together metal edge portions with a lapped seam comprising means for advancing said edge portions, shoe means for maintaining said edge portions in edge-to-edge, nonoverlapping relation, lapping means following said shoe means for bringing said edge portions into overlapping relation, means for pressing the overlapping edge portions together at a weld point, and means for supplying electrical heating current of a frequency of the order of 100,000 cycles per second or higher to said edge portions in advance of the position in which they are brought into overlapping relation.

26. Apparatus for welding together with a lapped seam the edge portions adjacent a longitudinal gap in tubing formed of sheet metal, such apparatus comprising in combination: means for rapidly advancing the tubing, first means for bringing said edge portions into spaced, edge-to-edge relation, second means for thereafter bringing one of said portions in overlying lapped relation to, and with a diminishing spaced relation to the other commencing at a predetermined position, whereby a narrow band on the undersurface of the overlying portion will come into contact with a narrow band on the upper surface on the underlying portion at a desired weld point; means for heating said bands in advance of the weld point comprising a source of electrical current of a frequency of the order of 100,000 cycles per second or higher and current transfer means connected to the terminals of said source and positioned to supply such current to said portions substantially in advance of said position, whereby the current will flow along said edge portions in advance of said position and to and from the weld point along on said bands; a roller positioned in the tubing to engage the zone of the lapped seam therein to support same at a predetermined elevation while passing beneath the weld point; supporting means extending into the tubing for supporting said roller in substantially a fixed axis; and a pressure-applying roller and means for supporting same in a position to apply pressure to the overlying portion at a zone substantially directly over the weld point to press said portion firmly against and into welded relation to the underlying portion.

* * * * *